United States Patent
Shen et al.

(10) Patent No.: US 9,530,552 B1
(45) Date of Patent: Dec. 27, 2016

(54) MAGNETIC CIRCUIT SWITCHING DEVICE WITH SINGLE-SIDED ATTRACTION

(71) Applicants: Yu-Chiao Shen, Taoyuan (TW); Tung-Po Wu, Taoyuan (TW)

(72) Inventors: Yu-Chiao Shen, Taoyuan (TW); Tung-Po Wu, Taoyuan (TW)

( * ) Notice: Subject to any disclaimer, the term of this patent is extended or adjusted under 35 U.S.C. 154(b) by 0 days.

(21) Appl. No.: 14/953,130

(22) Filed: Nov. 27, 2015

(51) Int. Cl.
| | | |
|---|---|---|
| *F16K 31/08* | (2006.01) | |
| *H01F 7/20* | (2006.01) | |
| *H01F 7/06* | (2006.01) | |
| *H01F 7/02* | (2006.01) | |
| *H01F 7/16* | (2006.01) | |
| *H01F 7/122* | (2006.01) | |

(52) U.S. Cl.
CPC ............ *H01F 7/20* (2013.01); *F16K 31/082* (2013.01); *H01F 7/02* (2013.01); *H01F 7/066* (2013.01); *H01F 7/122* (2013.01); *H01F 7/1615* (2013.01)

(58) Field of Classification Search
CPC ....... H01F 7/122; H01F 7/1615; F16K 31/082
USPC ................................................. 335/229–234
See application file for complete search history.

(56) References Cited

U.S. PATENT DOCUMENTS

| | | | | |
|---|---|---|---|---|
| 4,419,643 A | * | 12/1983 | Ojima ................... | H01F 7/1615 335/230 |
| 4,603,832 A | * | 8/1986 | Sjoquist ................. | A01G 25/16 251/129.03 |
| 5,029,807 A | * | 7/1991 | Fuchs ................... | F16K 31/082 251/129.18 |

* cited by examiner

*Primary Examiner* — Ramon M Barrera
(74) *Attorney, Agent, or Firm* — Rosenberg, Klein & Lee

(57) ABSTRACT

A magnetic circuit switching device with single-sided attraction includes a housing with a first side and a second side individually arranged at either side, where the first side has an attraction surface to attract an iron core; a permanent magnet having a first type magnetic pole and a second type magnetic pole individually arranged at inner and outer side with opposite properties; a nonconductive axial tube for the iron core to engage, having an opening at the right side extending to the second side of the housing; and a spring providing elastic force for the iron core to displace. With a magnetic path alteration function and the elastic force from the spring, the structure is able to keep the iron core in a pre-determined position. Therefore the iron core has a wider stretching range for operation, increasing the possibilities of wider application and ensuring in-time adjusting in case of deviation and wear and tear of the device. Also, the present invention requires less power for operation, thus achieving an energy-saving effect.

5 Claims, 8 Drawing Sheets

MAGNETIC CIRCUIT SWITCHING DEVICE WITH SINGLE-SIDED ATTRACTION

BACKGROUND OF THE INVENTION

1. Field of the Invention

The present invention relates to a magnetic circuit switching device with single-sided attraction, particularly to one that has two magnetic circuits and a single-sided attraction structure for a displaceable iron core to have a wider stretching range in operation.

2. Description of the Related Art

The theory of magnetic field effect has been widely applied to valves, solenoids, and relays. A conventional solenoid valve attracts an iron core thereof by a magnetic force produced by an energized coil to open a valve port thereof. However, such solenoid valve has to keep energizing the coil to attract the iron core aside and keep a fixed position of the iron core, so as to keep the valve port opened. Therefore, it needs a great amount of power supply, and the solenoid valve would be overheated and burned by a short circuit after continuous operation.

The present inventor has therefore disclosed a magnetic power apparatus in U.S. Pat. No. 6,246,131 and a magnetic device with double fixing positions for changing the magnetic circuit in U.S. Pat. No. 6,057,750. The structure of a magnetic power apparatus 100 is illustrated in FIGS. 1A and 1B, including an outer shell 101, a coil 102, an iron core 103, a permanent magnet 104, a left attraction surface 105, and a right attraction surface 106. When the coil 102 is energized, the iron core 103 displaces leftwards or rightwards due to the magnetic force from the coil 102 or the permanent magnetic 104. Such structure has both sides to fixedly keep the position of the iron core 103 in operation by the permanent magnet 104, so it does not need continuous electricity supply, thus being energy-saving and preventing the invention from overheating and burning by a short circuit. The safety and durability are therefore ensured in the improved structure. However, the stretching range D of the iron core 103 is restricted due to the double sided fixing position; that is, the right attraction surface 106 is a closed structure 107. If the stretching range D is design to be 5 mm, the iron core 103 can only displaces exactly 5 mm, shorter or further is impossible. In this case, when an applied device (not shown) has deviation or wear and tear, the operation would be affected. Either the design is the permanent magnet 104 in a column shape with the iron core 103 disposed around the permanent magnet 104 as shown in FIGS. 1A and 1B, or the design is the permanent magnet 104 in a ring shape with the iron core 103 disposed in-between a plurality of permanent magnets 104 as shown in FIGS. 5 and 6 in the U.S. Pat. No. 6,246,131, the defect would affect the operation.

Consequently, the inventor has devoted to improving the restriction defect of the stretching range of the iron core 103.

SUMMARY OF THE INVENTION

A primary object of the present invention is to provide a magnetic circuit switching device with single-sided attraction that has a magnetic path alteration function and an elastic force from a spring to keep an iron core in a pre-determined position, also enabling the iron core to have a wider stretching range for operation, increasing the possibilities of wider application and ensuring in-time adjusting in case of deviation and wear and tear of the device.

Another object of the present invention is to provide a magnetic circuit switching device with single-sided attraction that is able to change a normal position of the iron core with less power supply for operation, thus achieving an energy-saving effect.

In order to achieve the object above, the present invention comprises a housing including a coil arranged therein for an iron core to linearly displace within; said iron core being at least partially engaged in the coil in normal status; a driving circuit arranged aside the housing to provide an impulse voltage for path altering of a magnetic force, changing a position of the iron core, and therefore forming a solenoid magnetic device; wherein the housing further has a first side and a second side individually arranged at either side thereof, both of which are conductive, and the first side has an attraction surface to attract a left surface of the iron core; a permanent magnet having a first type magnetic pole and a second type magnetic pole individually arranged at inner and outer side thereof with opposite properties, the second type magnetic pole contacting the second side of the housing and a right section of the iron core being able to pass through an inner periphery of permanent magnet for operation; a nonconductive axial tube for a left section of the iron core to engage, having an opening at right side thereof extending to the second side of the housing for a right surface of the iron core to be pushed out from the housing; and a spring arranged around the iron core at a pre-determined position to provide elastic force for the iron core.

Whereby a magnetic path of the coil starts from the first type magnetic pole to the iron core, the second side, and then the second type magnetic pole when the coil is not energized, forming an outward magnetic circuit to provide a magnetic force for the iron core to displace rightwards with the spring providing an elastic force for the displacement as well, so that the iron core is kept in a position near the right; and when the driving circuit outputting an impulse voltage, the coil is energized, and a magnetic force produced thereby is greater than the magnetic force of the permanent magnet, therefore switching the magnetic path into a path starting from the first type magnetic pole to the iron core, the attraction surface, the first side, the housing, the second side, and then the second type magnetic pole, forming an inward magnetic circuit to force the iron core to displace leftwards and to have the left surface thereof fixedly attracted to the attraction surface for being kept in a position near the left; with the path alteration and the elastic force from the spring, the iron core is able to be stably kept in a position without consuming more electricity energy.

In addition, the iron core includes a conductive left section and a nonconductive right section to be engaged to form the iron core, and the driving circuit includes an output wire connected to the coil, which outputs a positive impulse voltage when electrified, and outputs a negative impulse voltage when not electrified, so that the coil is able to alter the magnetic path thereby, therefore displacing the iron core and keeping it in a steady position. The first type magnetic pole of the permanent magnet is the north pole and the second magnetic pole is the south pole; the first type magnetic pole of the permanent magnet further has a magnetic ring.

In an applicable embodiment, the attraction surface is arranged at an end of a column body perpendicularly disposed on an inner side of the first side. The column body has an axial through hole arranged therein. And the second side further connects to a valve which has a chamber arranged at the right side of the iron core and is separately connected to an inlet hole and an outlet hole so that the right surface of the iron core is able to abut on the inlet hole for closure; and the iron core further has a guiding hole connecting the chamber, so as to guide the air flowing back to the chamber to pass through the iron core and the axial through hole of the column body, to be discharged from the first side.

With features disclosed above, the present invention has double magnetic circuits with single-sided attraction structure to replace the closed structure design disclosed in U.S. Pat. No. 6,246,131, so as to keep an iron core in a predetermined position. With a magnetic path alteration function and an elastic force from a spring, the iron core has a wider stretching range for operation, increasing the possibilities of wider application and ensuring in-time adjusting in case of deviation and wear and tear of the device. Also, the present invention requires less power for operation, thus achieving an energy-saving effect.

DETAILED DESCRIPTION OF THE PREFERRED EMBODIMENT

Figure 1A:
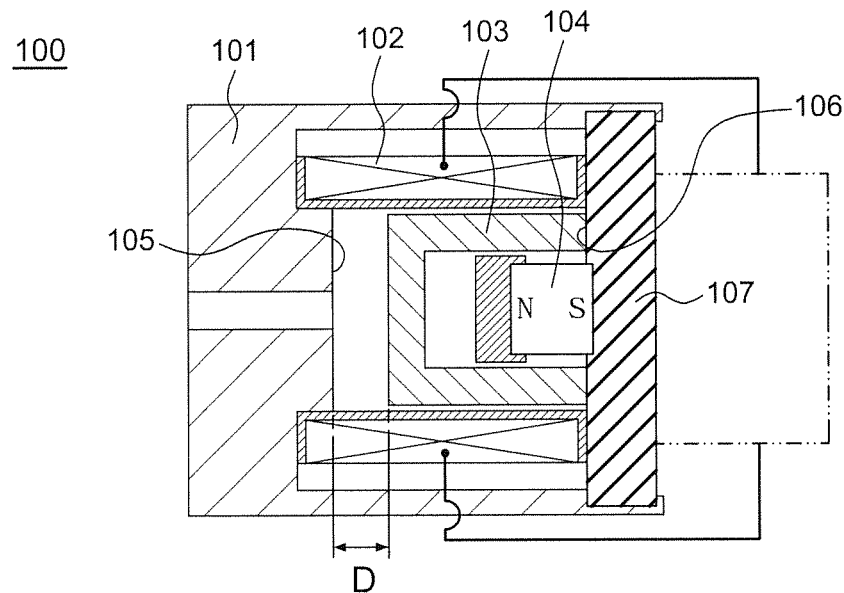
FIG. 1A is a schematic diagram of a conventional double fixed solenoid valve structure, illustrating an iron core thereof displacing rightwards.
Figure 1B:
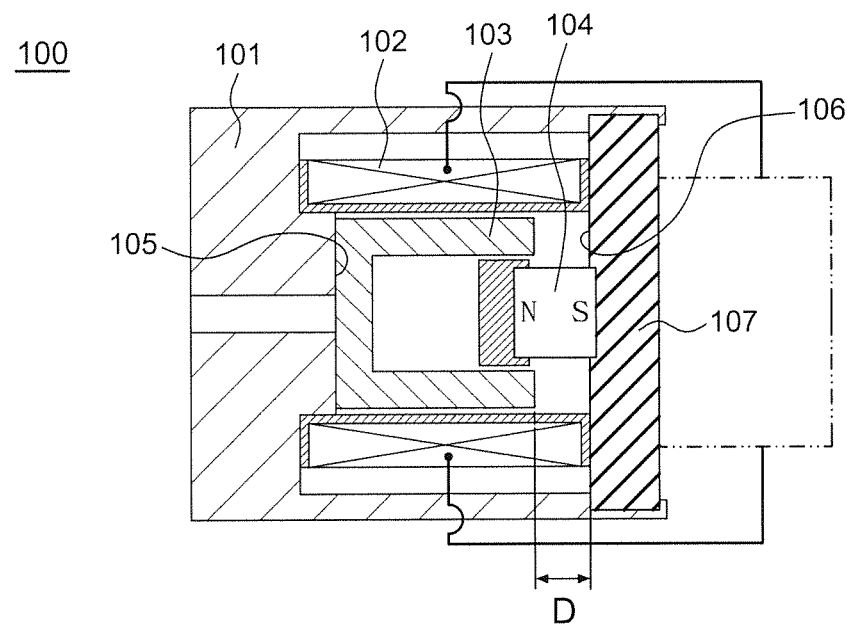
FIG. 1B is a schematic diagram of a conventional double fixed solenoid valve structure, illustrating an iron core thereof displacing leftwards.
Figure 2A:
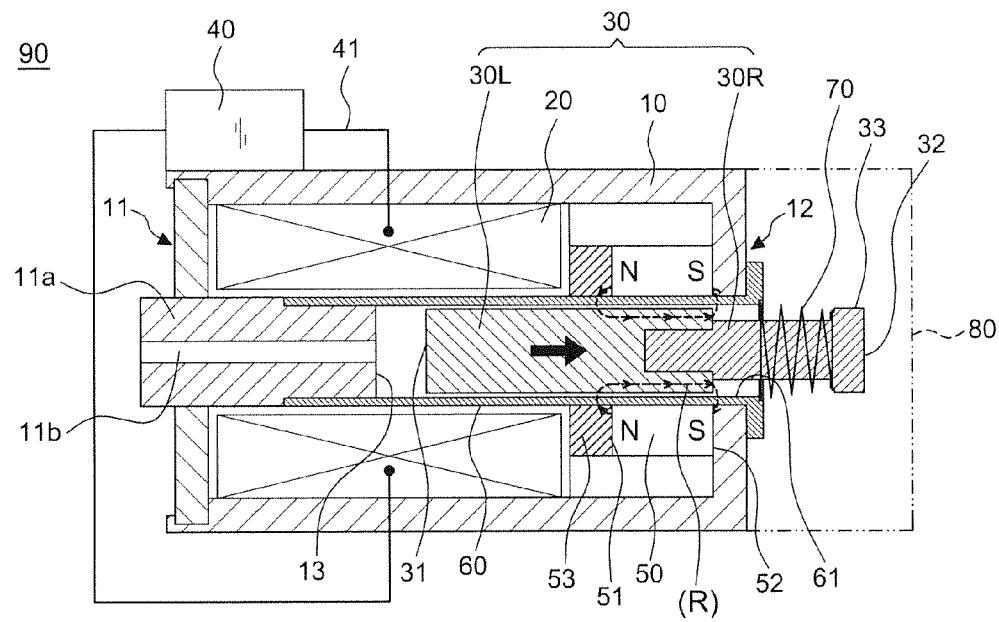
FIG. 2A is a sectional view of the invention in an applicable embodiment, illustrating an iron core thereof displacing rightwards.
Figure 2B:
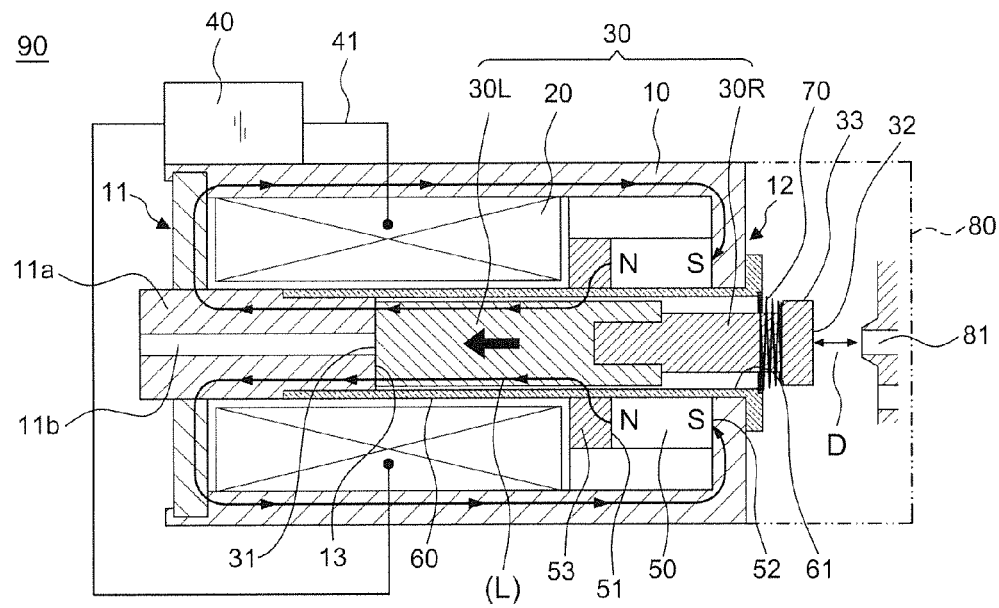
FIG. 2B is a sectional view of the invention in an applicable embodiment, illustrating an iron core thereof displacing leftwards.

Referring to FIGS. 2A and 2B, the present invention includes a housing 10, a driving circuit 40, a permanent magnet 50, a nonconductive axial tube 60, and a spring 70.

The housing 10 has a coil 20 arranged therein for an iron core 30 to linearly displace within. The iron core 20 is at least partially engaged in the coil 20 in normal status. The driving circuit 40 is arranged aside the housing 10 to provide an impulse voltage for path altering of a magnetic force, changing a position of the iron core 30, and therefore forming a solenoid magnetic device 90; such structure has been disclosed in the prior art.

The feature of the present invention lies in that the housing 10 further has a first side 11 and a second side 12 individually arranged at either side thereof, both of which are conductive, and the first side 11 has an attraction surface 13 to attract a left surface 31 of the iron core 30.

The permanent magnet 50 has a first type magnetic pole 51 and a second type magnetic pole 52 individually arranged at inner and outer side thereof with opposite properties. The second type magnetic pole 52 contacts the second side 12 of the housing 10 for operation. In this embodiment, the first type magnetic pole 51 of the permanent magnet 50 is the north pole and the second magnetic pole 52 is the south pole; and a right section 30R of the iron core 30 is able to pass through an inner periphery of the permanent magnet 50 for operation. The iron core 30 is preferred to include a conductive left section 30L and a nonconductive right section 30R to be engaged to form the iron core 30, but the present invention is not limited to such application. The iron core 30 is also applicable to be formed in one-piece by conductive materials, but the right section 30R should be arranged with a diameter shorter than the one of the left section 30L to avoid affecting the magnetic path, so that the magnetic path would follow the direction in the unbroken lines shown in FIG. 3C, entering the south pole and exiting from the north pole, then going along the left section 30L of the iron core 30. In short, the magnetic path would not be affected or changed whether the right section 30R of the iron core 30 is made of conductive materials or not.

Figure 5A:
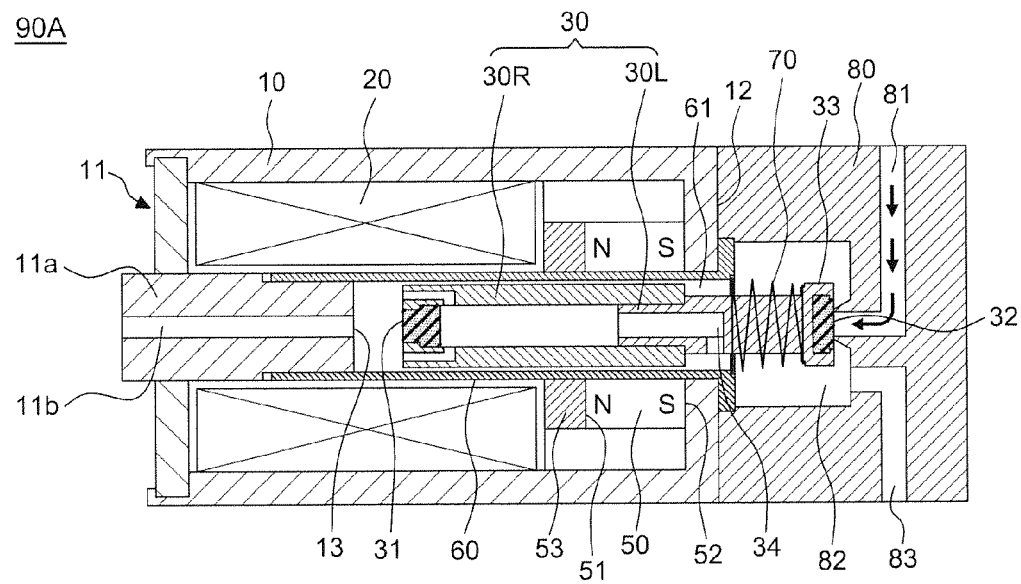
FIG. 5A is another application example of the present invention applied to a solenoid valve, showing rightward displacement of the iron core stopping the air intake.
Figure 5B:
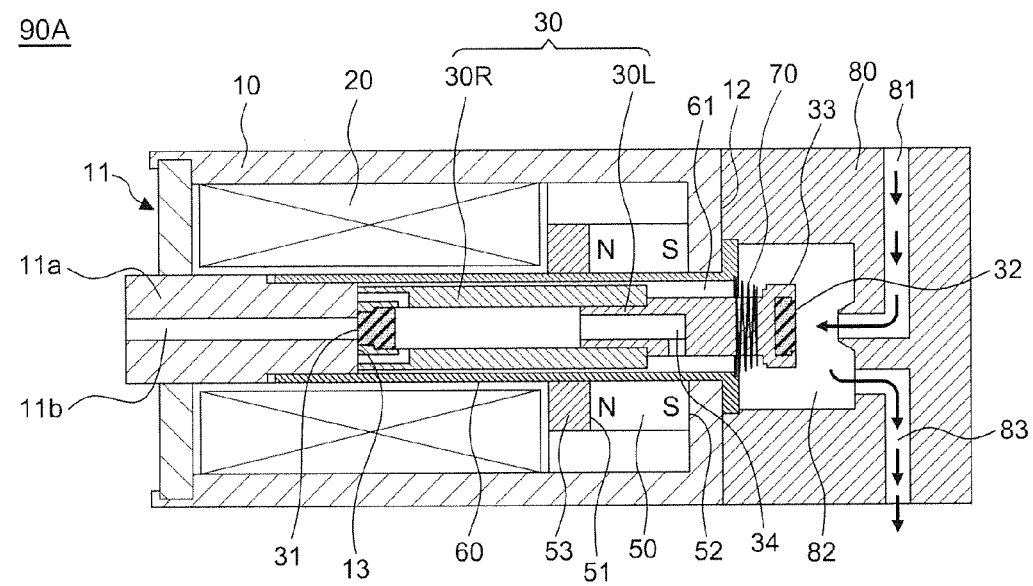
FIG. 5B is another application example of the present invention applied to a solenoid valve, showing leftward displacement of the iron core enabling the air intake and outlet.
Figure 5C:
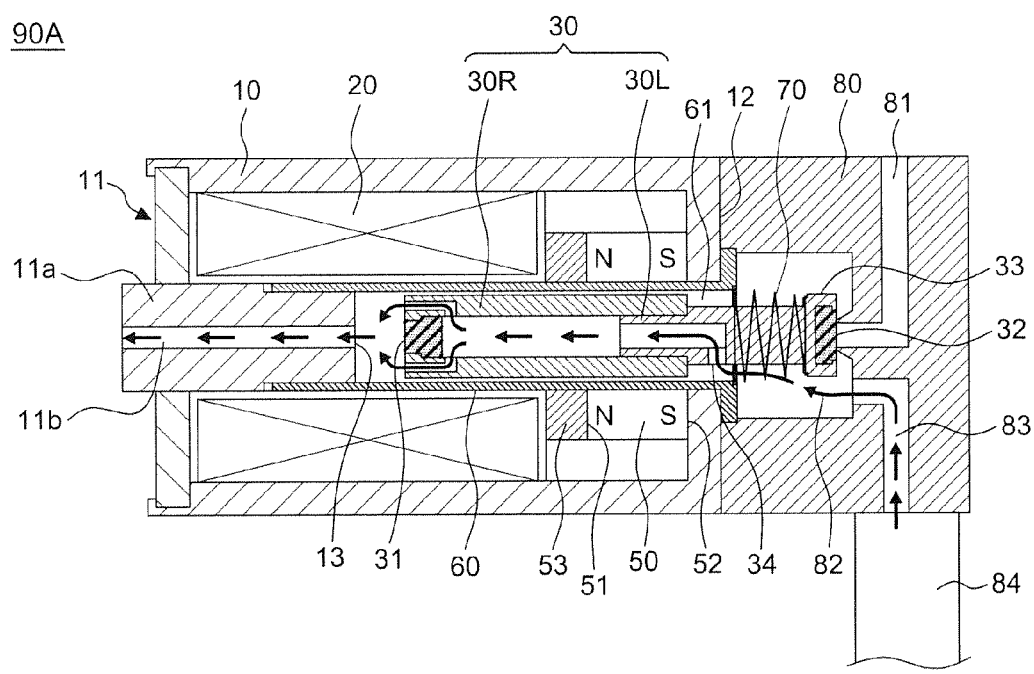
FIG. 5C is another application example of the present invention applied to a solenoid valve, showing rightward displacement of the iron core stopping the air intake and enabling the air outlet.

Furthermore, the iron core 30 has a right surface 32 arranged at the corresponding side to the left surface 31. Referring to FIGS. 5A to 5C, in a preferred embodiment, the left surface 31 and the right surface 32 each has a flat surface arranged thereon for abutment on the attraction surface 13 or a pre-determined position, and the flat surfaces may further have adhesives thereon to ensure a tight and fixed abutment.

The nonconductive axial tube 60 is arranged for the left section 30L of the iron core 30 to engage; it has an opening 61 at right side thereof extending to the second side 12 of the housing 10 for the right surface 32 of the iron core 30 to be pushed out from the housing 30. The spring 70 is arranged around the iron core 30 at a pre-determined position to provide elastic force for the iron core 30. In this embodiment, the spring 70 is mounted around the right section 30R of the iron core 30 with its inner end abutting on the opening 61 of the axial tube 60 and its outer end abutting on a protruding flange 33 at the right end of the iron core 30, so as to provide elastic force for the iron core 30 to displace rightwards. Or the spring 70 can be arranged between the left surface 31 of the iron core 30 and the attraction surface 13 to provide elastic force with the same effect.

As illustrated in FIG. 2A, whereby a magnetic path of the coil 20 is formed starting from the first type magnetic pole 51—the north pole—to the iron core 30, the second side 12, and then the second type magnetic pole 52—the south pole—when the coil 20 is not energized, thus forming an outward magnetic circuit R to provide a magnetic force for the iron core 30 to displace rightwards with the spring 70 providing an elastic force for the displacement as well, so that the iron core 30 is kept in a position near right. A feature of the present invention is that the right surface 32 of the iron core 30 is not restricted by a closed side; it can pass through the second side 12. Unlike a conventional device, the iron core 30 of the present invention therefore has a wider stretching range for operation. In addition, the second side 12 further connects to a valve 80 which has an inlet hole 81; the iron core 30 is able to complement any deviation and wear and tear of the device, ensuring in-time adjusting when the right surface 32 is abutting on the inlet hole 81 during operation.

Further referring to FIG. 2B, when the driving circuit 40 outputs an impulse voltage, the coil 20 is energized and a magnetic force produced thereby is greater than the magnetic force of the permanent magnet 50, therefore switching the magnetic path into a path starting from the first type magnetic pole 51—the north pole—to the iron core 30, the attraction surface 13, the first side 11, the housing 10, the second side 12, and then the second type magnetic pole 52—the south pole, forming an inward magnetic circuit L to force the iron core 30 to displace leftwards and to have the left surface 31 thereof fixedly attracted to the attraction surface 13 for being kept in a position near the left. With the path alteration and the elastic force from the spring 70, the iron core 30 is able to be stably kept in a position without consuming more electricity energy.

In this embodiment, the first type magnetic pole 51 of the permanent magnet 50 has a magnetic ring 53 for enhancement of the magnetic force; that is, the magnetic path from the first type magnetic pole 51 would pass the magnetic ring 53 and then go to the iron core 30 for an enhanced magnetic force for operation. If the magnetic force of the permanent magnet 50 is strong enough, the magnetic ring 53 can be optional. Most devices do not have a magnetic ring 53 in view of smaller volume and less cost requirement.

Figure 3A:
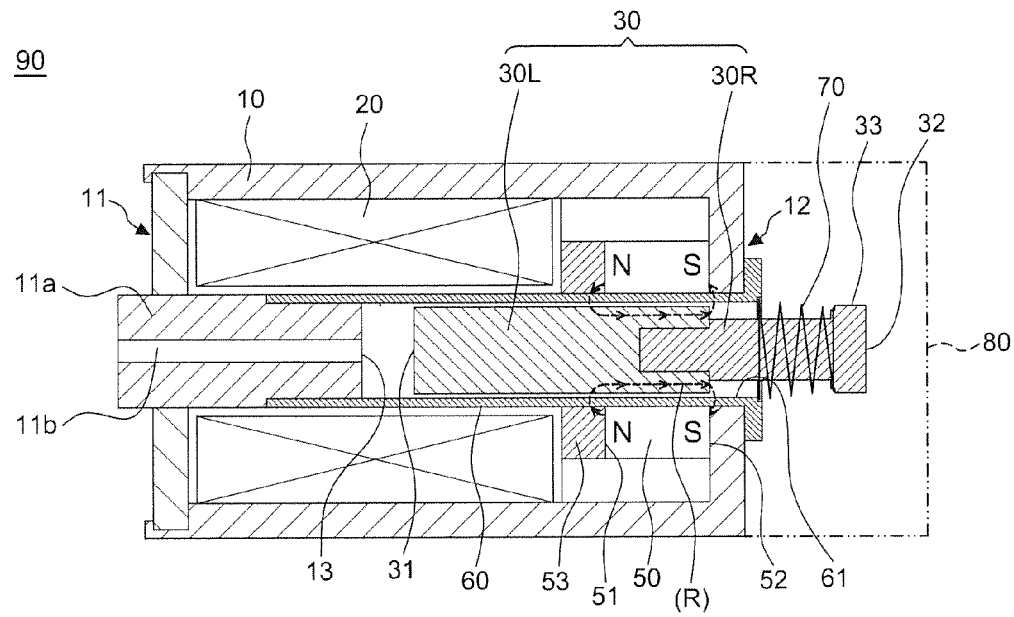
FIG. 3A is a schematic diagram of FIG. 2A, showing a magnetic path when the present invention is not activated.

To further illustrate the magnetic path change in FIGS. 2A and 2B, further referring to FIGS. 3A-3F, when the power supply is off, the coil 20 is not energized, and the magnetic path is the first type magnetic pole 51→the magnetic ring 53→the iron core 30→the second side 12→the second type magnetic pole 52, thus forming an outward magnetic circuit R as the broken lines shown in FIG. 3A, a schematic diagram of FIG. 2A when the coil 20 is not energized. The iron core 30 therefore receives a rightward pushing force provided by the permanent magnet 50.

Figure 3B:
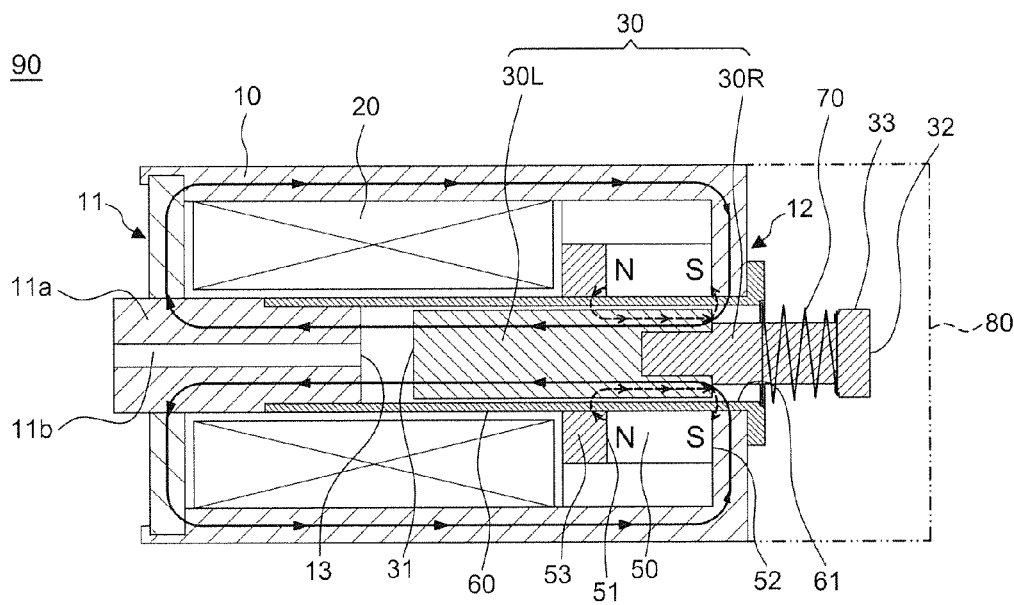
FIG. 3B is a schematic diagram showing a magnetic path when the present invention is activated by a positive impulse voltage.
Figure 3C:
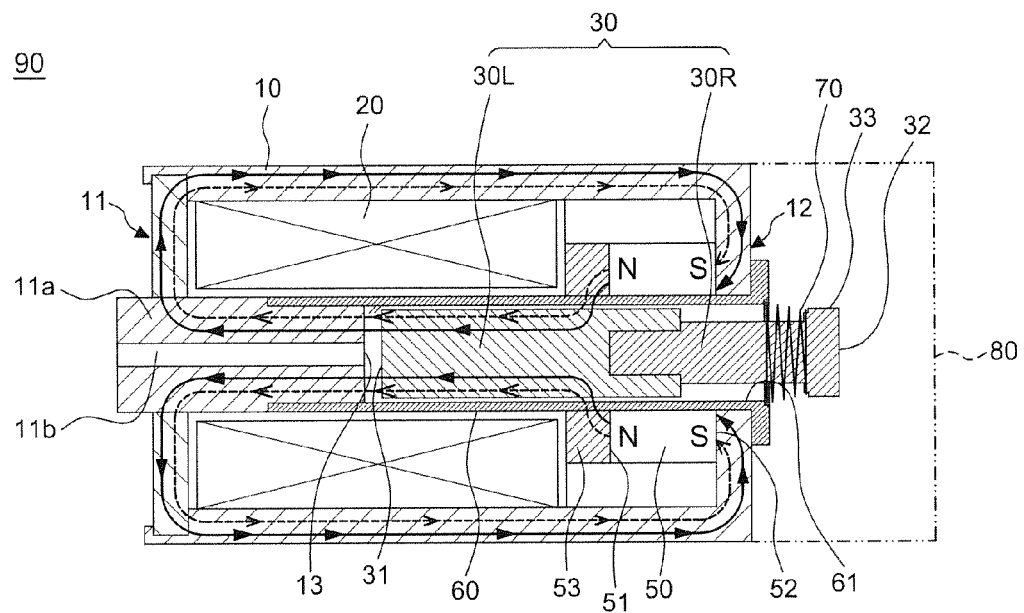
FIG. 3C is a schematic diagram showing a magnetic path when the iron core is displacing leftwards.
Figure 3D:
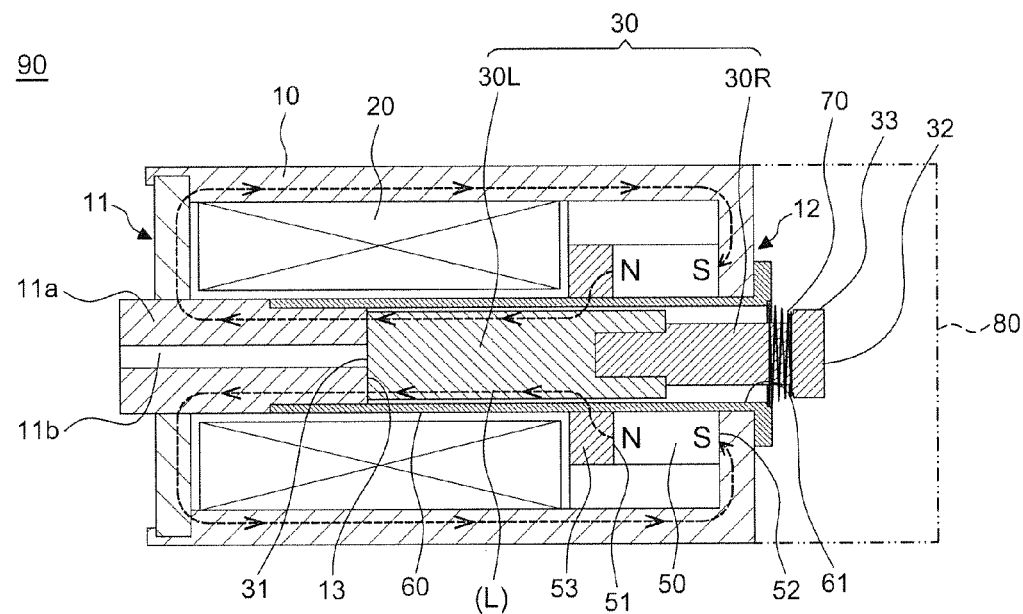
FIG. 3D is a schematic diagram showing a magnetic path after the iron core displaces leftwards.

FIG. 3B illustrates the magnetic path when the device receives a positive impulse voltage. When receiving a positive impulse voltage, the original path of the magnetic force of the permanent magnet 50 (shown in broken lines) would be offset by a magnetic force produced by the power energy (shown in unbroken lines), turning the magnetic path of the permanent magnet 50 into the direction of the path of the coil 20 and forcing the iron core 30 displacing leftwards as shown in FIG. 3C; the magnetic path of the coil 20 is the shortest route. After the iron core 30 displaces leftwards, the magnetic path would become the one shown in FIG. 3C, entering into the second type magnetic pole 52 and exiting from the first type magnetic pole 51. Then the iron core 30 displaces leftwards to a position shown in FIG. 3D, with the magnetic path being the first type magnetic pole 51→the magnetic ring 53→the iron core 30→the attraction surface 13→the first side 11→the housing 10→the second side 12→the second type magnetic pole 52, thus forming an inward magnetic circuit L and keeping the iron core 30 in position without energizing the coil 20.

Figure 3E:
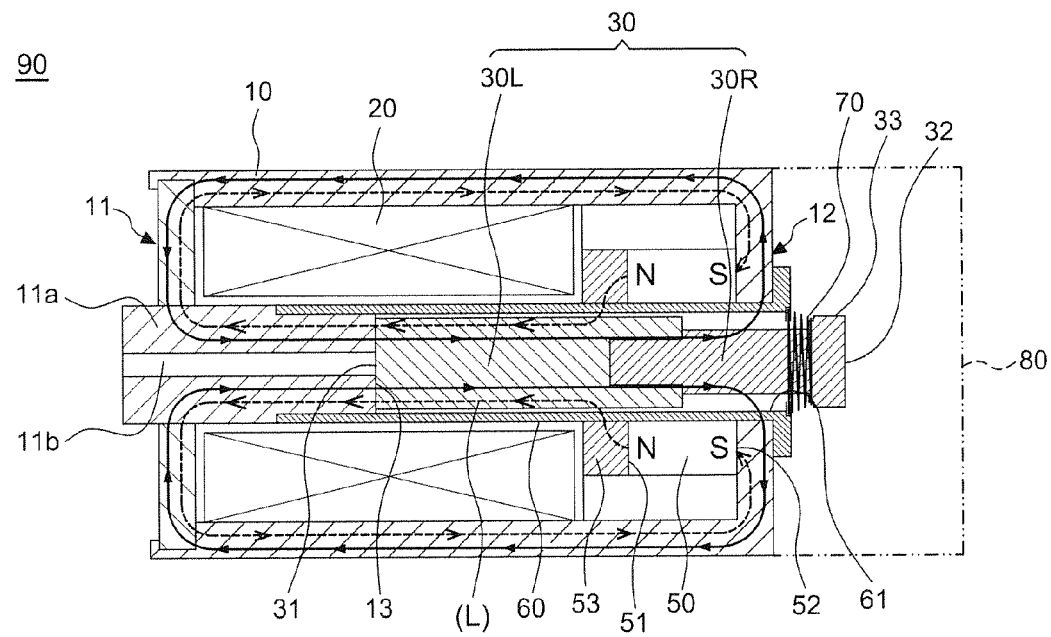
FIG. 3E is a schematic diagram showing a magnetic path when the present invention is activated by a negative impulse voltage.
Figure 3F:
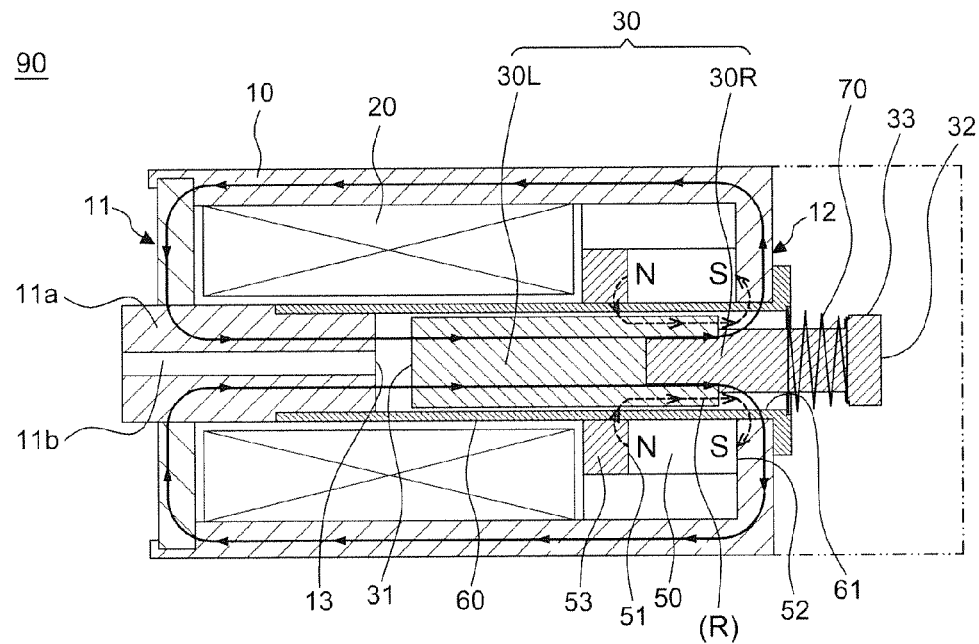
FIG. 3F is a schematic diagram showing a magnetic path after the iron core displaces rightwards.

FIG. 3E illustrates the magnetic path when the device receives a negative impulse voltage. The iron core 30 is originally kept leftwards, thus the magnetic path of the coil 20 has to be reverse of the one shown in FIG. 3D to displace the iron core 30 rightwards. When receiving a negative impulse voltage, the magnetic path is shown in unbroken lines in FIG. 3E, producing a force to displace the iron core 30 to the right. The magnetic force in the path shown in broken lines would offset the force produced by the permanent magnet 50 and the attraction surface 13 would repel, therefore displacing the iron core 30 rightwards to a position shown in FIG. 3F. The magnetic path is the shortest so continuous power supply for the coil 20 is not necessary. The path would be the first type magnetic pole 51→the magnetic ring 53→the iron core 30→the second side 12→the second type magnetic pole 52, thus forming a closed outward magnetic circuit R to provide a rightwards magnetic force for the iron core 30; Together with the elastic force from the spring 70, the iron core 30 displaces back to the position shown in FIG. 3A without energizing the coil 20. The spring 70 offers elastic force for the iron core 30 to displace rightwards, therefore it may increase little counter force when the iron core 30 displaces leftwards; but this would not affect the displacement operation at all. With the spring 70 and the double magnetic circuits, the iron core 30 is able to displace without consuming much power energy, thus achieving an energy-saving feature.

In short, a feature of the present invention is to displace the iron core 30 by a magnetic force produced from the coil 20. The magnetic path of the permanent magnet 50 is altered since the path of a magnetic force is the shortest route; without another magnetic force in counter direction, the iron core 30 would keep staying in the same position.

The driving circuit 40 of the present invention can be disposed aside the housing 10 or isolated and connected to the coil 20 with an output wire 41 as shown in FIGS. 2A and 2B. When the output wire 41 is electrified, the driving circuit 40 would output a positive impulse voltage; when the output wire 41 is not electrified, the driving circuit 40 would output a negative impulse voltage, so that the coil 20 is able to alter the magnetic path thereby, therefore displacing the iron core 30 and keeping it in a steady position.

Figure 4A:
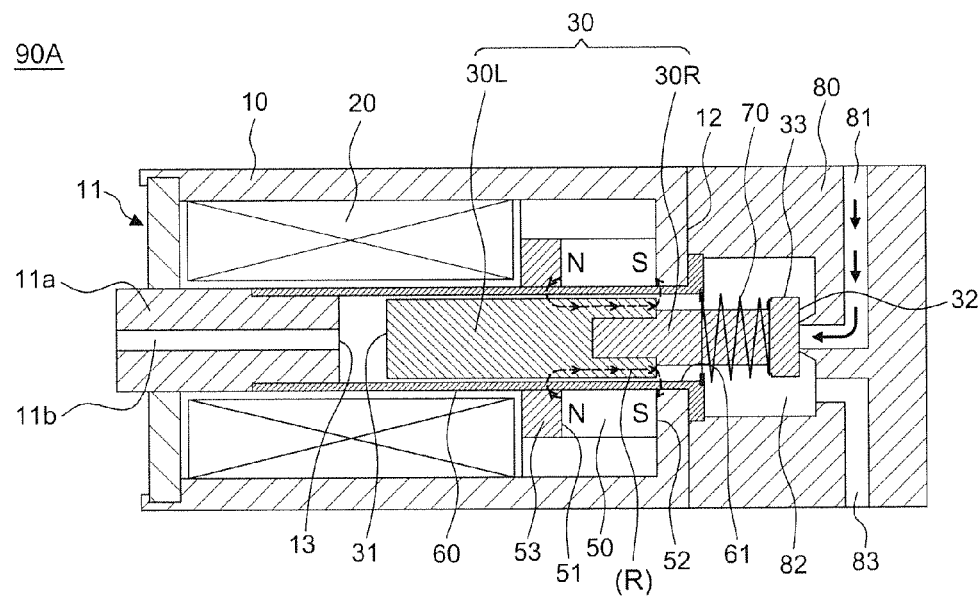
FIG. 4A is an application example of the present invention applied to a solenoid valve, showing rightward displacement of the iron core.
Figure 4B:
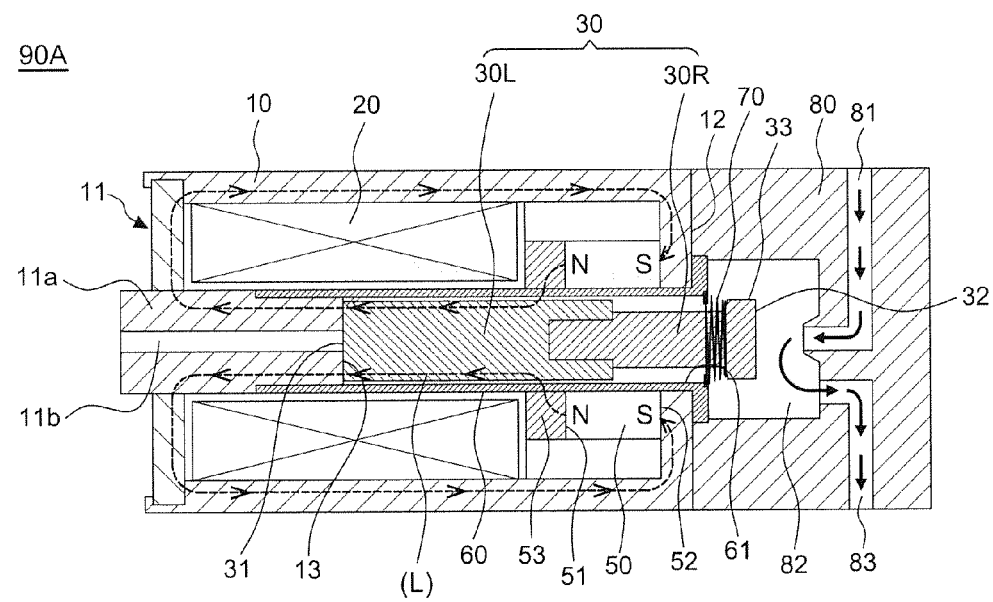
FIG. 4B is an application example of the present invention applied to a solenoid valve, showing leftward displacement of the iron core.

FIGS. 4A and 4B illustrate an application example of the present invention applied to a solenoid valve 90A. The second side 12 further connects to a valve 80 which has a chamber 82 arranged at the right side 32 of the iron core 30 and is separately connected to an inlet hole 81 and an outlet hole 83 so that the right surface 32 of the iron core 30 is able to abut on the inlet hole 81 for closure as shown in FIG. 4A. Referring to FIG. 4B, when the iron core 30 displaces leftwards, the inlet hole 81 opens for air to enter the chamber 82 and to be guided into the outlet hole 83, then a pre-determined device 84 which is shown in FIG. 5C, so as to function as a solenoid valve 90A.

Furthermore, FIGS. 5A-5C illustrated another application example of the present invention applied to a solenoid valve 90A. The iron core 30 further has a guiding hole 33 connecting the chamber 82, thereby the iron core 30 close the inlet hole 81 with its right surface 32 as shown in FIG. 5A, and FIG. 5B shows when the inlet hole 81 opens for air to enter the chamber 82 and then to be guided to the outlet hole 83; in FIG. 5C, the pre-determined device 84 is an air discharging device to guide the air flowing back to into the chamber 82 via the outlet hole 83 to pass through the iron core 30 and to be discharged from the first side 11 via an axial through hole 11b of a column body 11a. The present invention is especially suitable for such structure of a solenoid valve for features of simple structure and no residual magnetism, but it is also applicable to other electric devices as well.

With aforesaid structures and measures, the present invention has the outward magnetic circuit R and the inward magnetic circuit L with the design of single-sided attraction for fixing. By changing path of the magnetic force and the elastic force from the spring 70, the iron core 30 is able to be kept in a position with a wider stretching range for operation, increasing the possibilities of wider application and ensuring in-time adjusting in case of deviation and wear and tear of the device. The defect in U.S. Pat. No. 6,246,131 is therefore overcome. On the other hand, the present invention also requires less power for operation, thus achieving an energy-saving effect.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A magnetic circuit switching device with single-sided attraction, comprising:
   a housing including a coil arranged therein for an iron core to linearly displace within; said iron core being at least partially engaged in the coil in normal status;
   a driving circuit arranged aside the housing to provide an impulse voltage for path altering of a magnetic force, changing a position of the iron core, and therefore forming a solenoid magnetic device;
   wherein the housing further has a first side and a second side individually arranged at either side thereof, both of which are conductive, and the first side has an attraction surface to attract a left surface of the iron core;
   wherein the attraction surface is arranged at an end of a column body perpendicularly disposed on an inner side of the first side, and the column body having an axial through hole arranged therein;
      a permanent magnet having a first type magnetic pole and a second type magnetic pole individually arranged at inner and outer side thereof with opposite properties, the second type magnetic pole contacting the second side of the housing and a right section of the iron core being able to pass through an inner periphery of the permanent magnet for operation;
      a nonconductive axial tube for a left section of the iron core to engage, having an opening at right side thereof extending to the second side of the housing for a right surface of the iron core to be pushed out from the housing; and
      a spring arranged around the iron core at a pre-determined position to provide elastic force for the iron core;
   whereby a magnetic path starts from the first type magnetic pole to the iron core, the second side, and then the second type magnetic pole when the coil is not energized, forming an outward magnetic circuit to provide a magnetic force for the iron core to displace rightwards with the spring providing an elastic force for the displacement as well, the iron core being thereby kept in a rightward position; and when the driving circuit outputs an impulse voltage, the coil being energized, and a magnetic force produced thereby being greater than the magnetic force of the permanent magnet, therefore switching the magnetic path into a path starting from the first type magnetic pole to the iron core, the attraction surface, the first side, the housing, the second side, and then the second type magnetic pole, forming an inward magnetic circuit to force the iron core to displace leftwards and to have the left surface thereof fixedly attracted to the attraction surface for being kept in a leftward position; with the path alteration and the elastic force from the spring, the iron core being stably kept in position without consuming additional electrical energy;
   wherein the second side further connects to a valve having a chamber arranged at a right side of the iron core and is separately connected to an inlet hole and an outlet hole to enable the right surface of the iron core to abut the inlet hole for closure; and the iron core further having a guiding hole connecting the chamber, so as to guide the air flowing back to the chamber to pass through the iron core and the axial through hole of the column body, to be discharged from the first side.

2. The magnetic circuit switching device with single-sided attraction as claimed in claim 1, wherein the iron core includes a conductive left section and a nonconductive right section to be engaged to form the iron core.

3. The magnetic circuit switching device with single-sided attraction as claimed in claim 1, wherein the driving circuit includes an output wire connected to the coil, to selectively output a positive impulse voltage and a negative impulse voltage when electrically energized, so that the coil is able to alter the magnetic path thereby, therefore displacing the iron core and keeping it in a steady position.

4. The magnetic circuit switching device with single-sided attraction as claimed in claim 1, wherein the first type magnetic pole of the permanent magnet is the north pole and the second magnetic pole is the south pole.

5. The magnetic circuit switching device with single-sided attraction as claimed in claim 4, wherein the first type magnetic pole of the permanent magnet has a magnetic ring.

* * * * *